United States Patent
Lee et al.

(10) Patent No.: US 9,013,164 B1
(45) Date of Patent: Apr. 21, 2015

(54) CONSTANT ON-TIME CONTROLLER

(71) Applicant: Green Solution Technology Co., Ltd., New Taipei (TW)

(72) Inventors: Li-Min Lee, New Taipei (TW); Yuan Cai, Wuxi (CN); Chao Shao, Wuxi (CN); Quan Gan, Wuxi (CN)

(73) Assignee: Green Solution Technology Co., Ltd., New Taipei (TW)

( * ) Notice: Subject to any disclaimer, the term of this patent is extended or adjusted under 35 U.S.C. 154(b) by 0 days.

(21) Appl. No.: 14/228,259

(22) Filed: Mar. 28, 2014

(30) Foreign Application Priority Data

Dec. 18, 2013 (CN) .......................... 2013 1 0698109

(51) Int. Cl.
*H02M 1/14* (2006.01)
*H02M 3/156* (2006.01)
*H02M 3/158* (2006.01)

(52) U.S. Cl.
CPC ..................................... *H02M 3/158* (2013.01)

(58) Field of Classification Search
USPC ......................................... 323/282–286, 351
See application file for complete search history.

(56) References Cited

U.S. PATENT DOCUMENTS

| | | | |
|---|---|---|---|
| 8,446,135 B2 | 5/2013 | Chen et al. | |
| 8,525,505 B2 * | 9/2013 | Wang et al. | ................... 323/286 |
| 8,760,137 B2 * | 6/2014 | Nishida et al. | ................ 323/283 |
| 2013/0208520 A1 * | 8/2013 | Michishita | ....................... 363/84 |
| 2013/0241516 A1 * | 9/2013 | Ueno et al. | .................... 323/285 |

* cited by examiner

*Primary Examiner* — Jessica Han
(74) *Attorney, Agent, or Firm* — Jianq Chyun IP Office

(57) ABSTRACT

A constant on-time controller, comprising a ripple generator, a comparing circuit and a logic control circuit, is provided. The ripple generator generates a ripple signal, which is injected into one of a voltage reference signal and a voltage detection signal to form a ripple modulated signal with ripple information. The comparing circuit compares the ripple modulated signal with the other of the voltage reference signal and the voltage detection signal and accordingly generates a comparison result signal. The logic control circuit generates a control signal with a fixed pulse width according to the comparison result signal. The ripple generator has a level modulation circuit for modulating an amplitude of the ripple modulated signal to make the amplitude within an preset range under different applications.

17 Claims, 7 Drawing Sheets

CONSTANT ON-TIME CONTROLLER

CROSS-REFERENCE TO RELATED APPLICATION

This application claims the priority benefit of China application serial no. 201310698109.2, filed on Dec. 18, 2013. The entirety of the above-mentioned patent application is hereby incorporated by reference herein and made a part of this specification.

BACKGROUND OF THE INVENTION (1) Field of the Invention

The present invention relates to a constant on-time controller, and more particularly relates to a constant on-time controller with ripple compensation.

(2) Description of the Prior Art

The constant on-time synchronous buck converter is required smaller ripple in the output voltage with the trend in low operation voltage of the integrated circuit. To achieve the request of a smaller ripple of the output voltage, the constant on-time synchronous buck converter usually uses a multi-layer ceramic capacitor having a low equivalent series resistance as an output capacitance for supplying the output voltage. The multi-layer ceramic capacitor reduces the ripple of the output voltage, but simultaneously brings the stability problems. Therefore, the constant on-time synchronous buck converter is additionally injected with a ripple signal for improving the stability problems when using the multi-layer ceramic capacitor. The methods of injecting the ripple signal can be classified into two types: one is external injecting and the other is internal injecting, wherein the internal injecting type has the better cost advantage.

FIG. 1 is a circuit diagram of a conventional constant on-time controller with ripple compensation. The constant on-time controller controls a DC-DC buck converter to convert an input voltage Vin into an output voltage Vout. The DC-DC buck converter comprises a high-side transistor Q1, a low-side transistor Q2, an inductance L and an output capacitance Cout. The output capacitance Cout has an equivalent series resistance Rc. The high-side transistor Q1 and the low-side transistor Q2 are connected with each other via a phase node P, and another end of the high-side transistor Q1 is connected to the input voltage Vin and another end of the low-side transistor Q2 is connected to the grounding. One end of the inductance L is connected to the phase node P and the other end thereof is connected to the output capacitance Cout for generating the output voltage Vout.

The constant on-time controller is coupled to the phase node P of the high-side transistor Q1 and the low-side transistor Q2. The constant on-time controller comprises a pulse width modulation controller 11 and a drive 17. The pulse width modulation controller 11 comprises a synchronous signal generating circuit 13 and a pulse width modulation comparator 15. The synchronous signal generating circuit 13 comprises a low-pass filter 3 and an error amplifier 5. The low-pass filter 3 comprises a resistance R4 and a capacitance C4, and is connected to the phase node P for filtering the high frequency component of the voltage signal Vp of the phase node P, and generates a signal Slp with a triangle-like shape at a node X. A non-inverting end of the error amplifier 5 receives a voltage reference signal Vref1 and an inverting end thereof receives the signal Slp, and accordingly generates an error amplification signal S12. The pulse width modulation comparator 15 comprises an adder 7 and a comparator 9. The adder 7 superimposes the error amplification signal S12 and a voltage reference signal Vref2 to generates a superimposed signal S13. A voltage detection circuit 1 detects the output voltage Vout outputted by the DC-DC buck converter and generates a voltage detection signal Vfb. A non-inverting end of the comparator 9 receives the superimposed signal S13 and an inverting end thereof receives the voltage detection signal Vfb, and accordingly generates a pulse width modulation signal S9 to the drive 17. The driver 17 controls the high-side transistor Q1 and the low-side transistor Q2 according to the pulse width modulation signal S9 for stabilizing the output voltage Vout.

The weak point of the conventional constant on-time controller is that the ripple amount of the generated superimposed signal S13 varies significantly in the different applications. It results from that the amplitude and the duty cycle of the voltage signal Vp at the phase node P are changed significantly when applying different input voltage Vin, different output voltage Vout and/or different operating frequency This causes that deviation values between an actual output voltage and an ideal output voltage are different in the different applications.

SUMMARY OF THE INVENTION

In view of the prior art of the deviation value of the actual output voltage and the ideal output voltage is changed in different application, the constant on-time controller of the present invention can provide a substantial fixed ripple amount regardless of the applications, and so avoids the deviation value being changed with different application.

To accomplish the aforementioned and other objects, the present invention provides a constant on-time controller, adapted to control a converting circuit to switch for generating an output voltage. The constant on-time controller comprises a ripple generator, a comparing circuit and a logic control circuit. The ripple generator generates a ripple signal according to a first signal having a component in response to a current flowing through an inductance of the converting circuit and a second signal having a component in response to the output voltage or the current of the inductance, wherein an amplitude of second signal is smaller than an amplitude of the first signal when the second signal has the component in response to the current of the inductance. The ripple generator comprises a level modulation circuit to modulate levels of the first signal and the second signal according to an amplitude of the ripple signal. The comparing circuit receives the ripple signal, a voltage reference signal and a voltage detection signal indicative of the output voltage, and modulates one of the voltage reference signal and the voltage detection signal according to the ripple signal for generating a ripple modulated signal with a ripple information of the ripple signal. The comparing circuit compares the ripple modulated signal with the other of the voltage reference signal and the voltage detection signal for generating a comparison result signal. The logic control circuit generates a control signal with a fixed pulse width according to the comparison result signal for controlling the switching of the converting circuit.

The present invention also provides a constant on-time controller, adapted to control a converting circuit to switch for generating an output voltage. The constant on-time controller comprises a ripple generator, a comparing circuit and a logic control circuit. The ripple generator generates a ripple signal according to a first signal having a component in response to a current flowing through an inductance of the converting circuit and a second signal having a component in response to the output voltage or the current of the inductance, wherein an amplitude of the second signal is smaller than an amplitude of the first signal when the second signal has the component in response to the current of the inductance. The ripple generator comprises a level modulation circuit to modulate the amplitude of the ripple signal according to the output voltage and a control signal or according to an amplitude of the ripple signal. The comparing circuit receives the ripple signal, a voltage reference signal and a voltage detection signal indicative of the output voltage, and modulates one of the voltage reference signal and the voltage detection signal according to the ripple signal for generating a ripple modulated signal with a ripple information of the ripple signal. The comparing circuit compares the ripple modulated signal with the other of the voltage reference signal and the voltage detection signal for generating a comparison result signal. The logic control circuit generates the control signal with a fixed pulse width according to the comparison result signal for controlling the switching of the converting circuit.

The present invention also still provides a constant on-time controller, adapted to control a converting circuit to switch for generating an output voltage. The constant on-time controller comprises a ripple generator, a comparing circuit and a logic control circuit. The ripple generator generates a ripple signal according to a first signal having a component in response to a current flowing through an inductance of the converting circuit and a second signal having a component in response to the output voltage or the current of the inductance, wherein an amplitude of the second signal is smaller than an amplitude of the first signal when the second signal has the component in response to the current of the inductance. The ripple generator comprises a level modulation circuit to generate a modulated signal according to the output voltage and a control signal or according to an amplitude of the ripple signal. The comparing circuit receives the ripple signal, a voltage reference signal and a voltage detection signal indicative of the output voltage, and modulates one of the voltage reference signal and the voltage detection signal according to the ripple signal for generating a ripple modulated signal with a ripple information of the ripple signal. The comparing circuit compares the ripple modulated signal with the other of the voltage reference signal and the voltage detection signal for generating a comparison result signal. The comparing circuit comprises a signal injection circuit to modulate an amplitude of the ripple modulated signal according to the modulated signal. The logic control circuit generates the control signal with a fixed pulse width according to the comparison result signal for controlling the switching of the converting circuit.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 2:
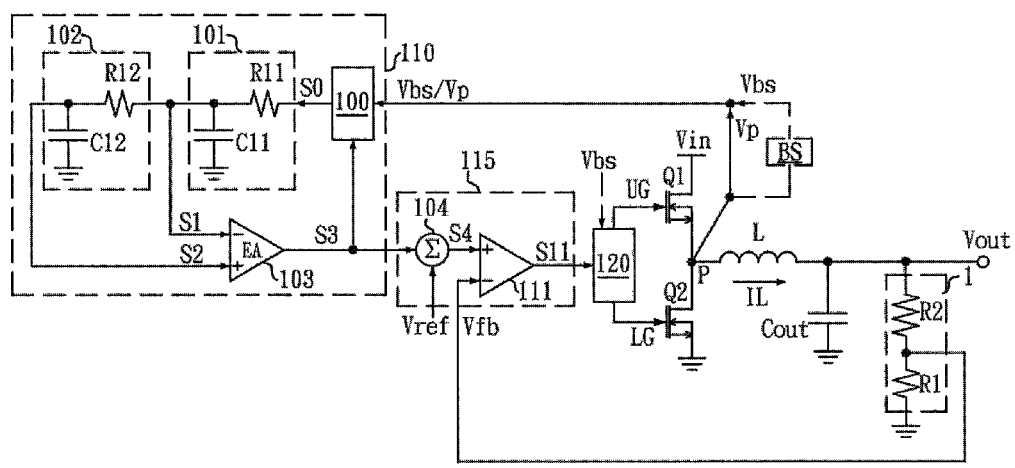
FIG. 2 is a circuit diagram of a constant on-time controller according a first preferred embodiment of the present invention.

FIG. 2 is a circuit diagram of a constant on-time controller according a first preferred embodiment of the present invention. The constant on-time controller controls a converting circuit to switch for generating an output voltage. In the present embodiment, the converting circuit is a DC-DC buck converter to convert an input voltage Vin into an output voltage Vout. The DC-DC buck converter comprises a high-side transistor Q1, a low-side transistor Q2, an inductance L and an output capacitance Cout. The high-side transistor Q1 and the low-side transistor Q2 are coupled to each other via a phase node P, another end of the high-side transistor Q1 is coupled to the input voltage Vin, and another end of the low-side transistor Q2 is coupled to the grounding. One end of the inductance L is coupled to the phase node P and the other end thereof is coupled to the capacitance Cout for generating the output voltage Vout. The DC-DC buck converter may additionally add a bootstrap circuit for providing a bootstrap voltage Vbs which is higher than the input voltage Vin to the constant on-time controller to make the constant on-time controller correctly control the switching of the high-side transistor Q1. One end of the bootstrap circuit BS is coupled to the phase node P. When the high-side transistor Q1 is cut off and the low-side transistor is turned on, a voltage Vp of the phase node P is approximately equal to a voltage level of the grounding, and an internal capacitance (not shown) of the bootstrap circuit BS is charged during the period. When the high-side transistor Q1 is turned on and the low-side transistor is cut off, the voltage Vp of the phase node P is approximately equal to a voltage level of the input voltage Vin. Therefore, the bootstrap voltage Vbs provided by the internal capacitance of the bootstrap circuit BS is approximately equal to the double of the input voltage during the period. A voltage detection circuit 1 detects the output voltage Vout for generating a voltage detection signal Vfb. In the present embodiment, the voltage detection circuit 1 has resistances R1 and R2 connected in series, and the output voltage Vout is divided by the resistances R1 and R2 to generate the voltage detection signal Vfb.

The constant on-time controller comprises a ripple generator 110, a comparing circuit 115 and a logic control circuit 120. The ripple generator 110 comprises a level modulation circuit 100, low-pass filters 101 and 102 and an amplifier 103, for generating a ripple signal S3. The level modulation circuit 100 is coupled to the phase node P or the bootstrap circuit BS, and generates a quasi-square wave signal S0 according to the voltage Vp of the phase node P or the bootstrap voltage Vbs. The low-pass filter 101 comprises a resistance R11 and a capacitance C11 connected in series, the other end of the resistance R11 is coupled to the level modulation circuit 100 and the other end of the capacitance C11 is coupled to the grounding. The node of the resistance R11 and the capacitance C11 generates a first signal S1 with a triangle-like shape. The first signal S1 and an inductance current IL flowing through the inductance L are synchronous, and so the first signal S1 can represent the inductance current IL. In actual application, the first signal S1 may be replaced by a detection signal of the inductance current IL or another signal having the component in response to the inductance current IL. The low-pass filter 102 comprises a resistance R12 and a capacitance C12 connected in series, and the node thereof generates a second signal S2, which is an approximate direct current signal or has a ripple component. In the present embodiment, the other end of the resistance R12 is coupled to the low-pass filter 101 for receiving the first signal S1, and the other end of the capacitance C12 is coupled to the grounding. Depend on the capacitance value (filtering capability) of the capacitance C12, the second signal S2 is an approximate direct current signal or a signal having ripple component (but the amplitude thereof is smaller than the amplitude of the first signal S1). In actual application, the low-pass filter 102 can be directly coupled to the level modulation circuit 100 to receive the quasi-square wave signal S0 for generating the second signal S2, and the amplitude of the second signal S2 is smaller than the amplitude of the first signal S1. Under the aforementioned modifications, such as: both the first signal S1 and the second signal S2 have the components in response to the inductance current IL; the first signal S1 and the second signal S2 have the components respectively in response to the inductance current IL and the output voltage Vout, the first signal S1 and the second signal S2 have the same DC component that can be eliminated with each other and so do not affect the function of the present invention. In the present embodiment, the second signal S2 can be the approximate direct current signal having the component in response to the output voltage Vout. In actual application, the second signal S2 may be a signal indicative of the output voltage Vout, such as: the output voltage Vout or a detection signal of the output voltage Vout and a signal having a component in response to the output voltage Vout; or a detection signal indicative of the inductance current, but the amplitude thereof is different with the amplitude of the first signal S1. The amplifier 103 receives the first signal S1 and the second signal S2, and generates the ripple signal S3 according to the level difference of the first signal S1 and the second signal S2. In the present embodiment, the amplifier 103 is a voltage amplifier, and an inverting end thereof receives the first signal S1 and a non-inverting end thereof receives the second signal S2, and increases (or reduces) the level difference of the first signal S1 and the second signal S2 to output the ripple signal S3. Therefore, the ripple signal S3 and the inductance current IL are reversely synchronized. The level modulation circuit 100 is coupled to an output end of the amplifier 103 for sampling the amplitude of the ripple signal S3, and modulates a level of the quasi-square wave signal S0 according to the sampled result for modulating the levels of the first signal S1 and the second signal S2. Thereby, the ripple generator 110 can modulate the amplitude of the ripple signal S3 by such circuit design for reducing the amplitude difference of the ripple signal S3 in the different applications, even fixing the amplitude regardless of the applications.

The comparing circuit 115 comprises a signal injection circuit 104 and a comparator 111. In the present embodiment, the signal injection circuit 104 is an adder to add the ripple signal S3 and a voltage reference signal Vref for generating a ripple modulated signal S4. An inverting end of the comparator 111 receives the voltage detection signal Vfb and a non-inverting end thereof receives the ripple modulated signal S4 and accordingly the comparator 111 generates a comparison result signal S11. The comparison result signal S11 is a high level when a level of the ripple modulated signal S4 is higher than the voltage detection signal Vfb, and the comparison result signal S11 is a low level when the level of the ripple modulated signal S4 is lower than the voltage detection signal Vfb.

In actual application, the signal injection circuit 104 may receive the ripple signal S3 and voltage detection signal Vfb for injecting the ripple information of the ripple signal S3 into the voltage detection signal Vfb to generate the ripple modulated signal S4. Under this applications, the non-inverting end of the comparator 111 receives the voltage detection signal Vfb and the inverting end thereof receives the ripple modulated signal S4. Besides, the amplifier 103 of the ripple generator 110 is correspondingly adjusted to that the non-inverting end of the amplifier 103 receives the first signal S1 and the inverting end thereof receives the second signal S2. Thus, it can achieve the completely same effect as the embodiment shown in FIG. 2.

As the above mentioned, the corresponding relation of the received signals and the input ends in the amplifier 103 of the ripple generator 110 and the comparator 111 of the comparing circuit 115 can be modulated without affecting the functions of the present invention. The following embodiments will not especially illustrate the corresponding relation between the input end and received signal.

The logic control circuit 120 receives the comparison result signal S11 and accordingly generates a control signal UG with a fixed pulse width for controlling the switching of the high-side transistor Q1 to make the converting circuit convert the input voltage Vin into the output voltage Vout. In synchronous buck application, the logic control circuit 120 generates another control signal LG for controlling the switching of the low-side transistor Q2. If both the high-side transistor Q1 and the low-side transistor Q2 are N-type MOSFETs, a high logic level of the control signal UG has to be higher than the input voltage Vin to turn on the high-side transistor Q1. Under the condition, the logic control circuit 120 may receive the bootstrap voltage Vbs to have the high logic level of the control signal UG be higher than the input voltage Vin. By controlling the switching of the high-side transistor Q1 and the low-side transistor Q2 to modulate the proportion of on-time period and off-time period for stabilizing the output voltage Vout.

Figure 3:
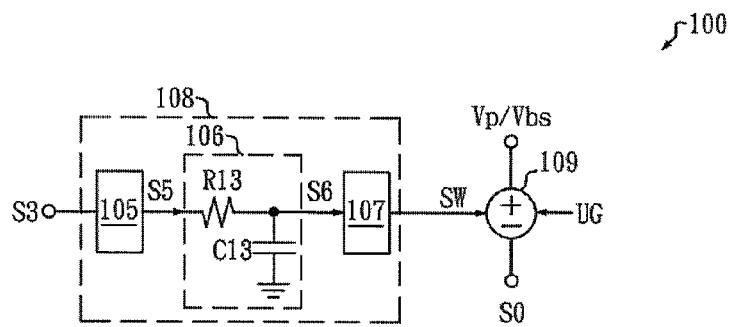
FIG. 3 is a schematic diagram of a level modulation circuit according to a first preferred embodiment of the present invention.

FIG. 3 is a schematic diagram of a level modulation circuit according to a first preferred embodiment of the present invention. The level modulation circuit 100 comprises a sampling judgment circuit 108 and a voltage-drop generating circuit 109 and determines modulation amounts of the levels of the first signal S1 and the second signal S2 according to the amplitude of the ripple signal S3, and then adjust one of the level of the voltage Vp of the phase node P and the bootstrap voltage Vbs to modulate the level of the quasi-square wave signal S0 and further the levels of the first signal S1 and the second signal S2.

The sampling judgment circuit 108 comprises an absolute value circuit 105, a filter 106 and a voltage judging circuit 107. Because of the ripple signal S3 is a triangle wave voltage signal without a DC component, and so the ripple signal S3 passes through the absolute value circuit 105 of the sampling judgment circuit 108 to form a voltage signal S5 having a double frequency and the DC component larger than zero. The filter 106 comprises a resistance R13 and a capacitance C13, for filtering a high-frequency component of the voltage signal S5 to generate a direct current signal S6. Then, the voltage judging circuit 107 detects a level of the direct current signal S6 for determining whether the direct current signal S6 is equal to a preset value or within at a preset range, and accordingly generates a control signal SW. In the present embodiment, the voltage judging circuit 107 can be an amplifier for scaling the difference of the direct current signal S6 and the preset value to generate the control signal SW. In the present invention, the preset value may be zero without affecting the function of the substantial fixed ripple of the present invention. A level of the control signal SW represents the difference of the direct current signal S6 and the preset value/range.

One end of the voltage-drop generating circuit 109 receives the voltage Vp of the phase node P or the bootstrap voltage Vbs, and another end thereof generates the quasi-square wave signal S0 and the voltage thereof is adjusted by the control signal SW. The voltage-drop generating circuit 109 is also controlled by the control signal UG. The control signal UG represents on-time period of the constant on-time controller, and so the voltage-drop generating circuit 109 only operates during the on time period. If the application environment of the constant on-time controller is a typical condition (i.e., a default application environment), the voltage-drop generating circuit 109 has no voltage there cross. Therefore, the signals at two ends, i.e., the quasi-square wave signal S0 and the voltage Vp of the phase node P or the bootstrap voltage Vbs, have the same level and vary in phase. If the application environment of the constant on-time controller is not the typical condition, the amplitude of the ripple signal S3 will deviate from the preset value or the preset range. Under the condition, the voltage judging circuit 107 modulates the voltage of the voltage-drop generating circuit 109 through the control signal SW. Thereby, modulating the level of the quasi-square wave signal S0 makes the amplitude of the ripple signal S3 be modulated to be the preset value or within the preset range.

Figure 4:
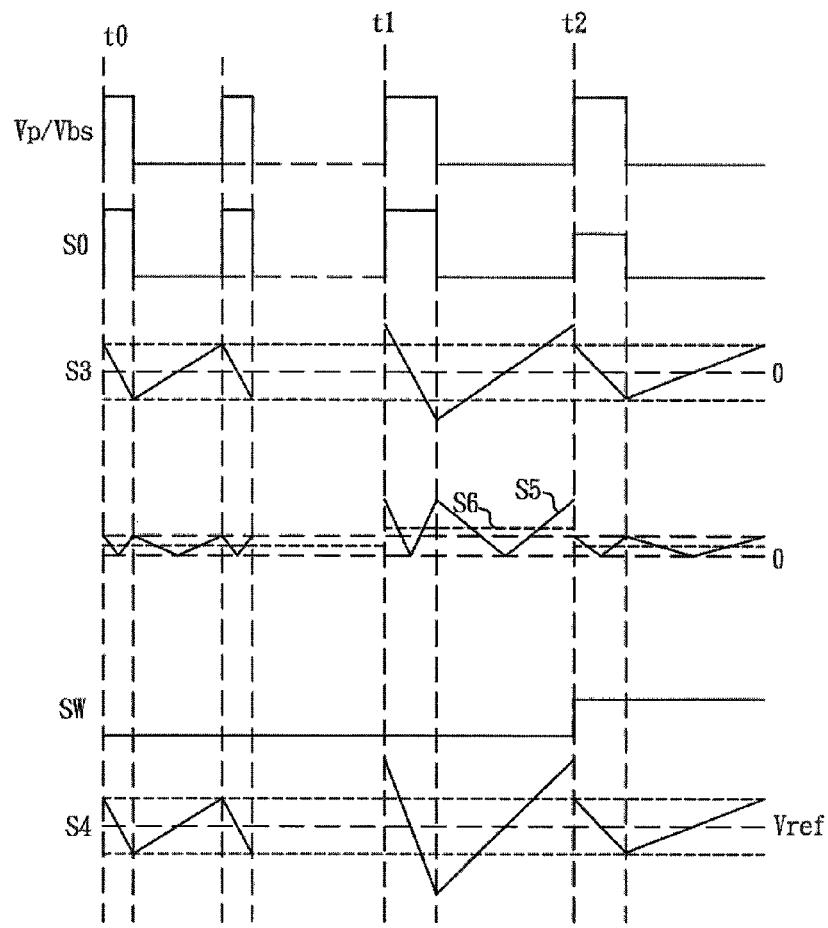
FIG. 4 shows signal waveforms of the level modulation circuit shown in FIG. 3.

FIG. 4 shows signal waveforms of the level modulation circuit shown in FIG. 3. During a period from the time point t0 to the time point t1, the application environment of the constant on-time controller is the typical condition. The amplitude of the ripple signal S3 is equal to the preset value, and the voltage judging circuit 107 does not generate the control signal SW. Thus, the voltage-drop generating circuit 109 generates zero voltage there cross, and the quasi-square wave signal S0 and the voltage Vp of the phase node P or the bootstrap voltage Vbs have the same level and vary in phase. Referring to FIG. 2, at the time point t1, a frequency of the new application environment of the constant on-time controller is lower and is not the typical condition. This causes that the amplitude of the ripple signal S3 becomes large and deviates from the preset value. The magnitudes of the voltage signal S5 and the direct current signal S6 also become larger. At the time point t2, the voltage judging circuit 107 detects the magnitude of the direct current signal S6 higher than the preset value, and generates the control signal SW to make the voltage-drop generating circuit 109 generate the voltage there cross for making the level of the quasi-square wave signal S0 lower than the level of the voltage Vp of the phase node P or the bootstrap voltage Vbs. Then, the level of the quasi-square wave signal S0 returns to be the same with the amount of the typical condition. Thus, the amplitude of the ripple signal S3 also is corrected to be same as the typical condition. Therefore, during the period from the time point t1 to the time point t2, nevertheless, the ripple of the ripple modulated signal S4 generated by the signal injection circuit 104 is large. After the time point t2, the ripple of the ripple modulated signal S4 is modulated to return to that as the typical condition. Hence, the magnitudes of the ripples of the ripple modulated signals S4 in the typical condition and the non-typical condition are substantially the same to avoid the problem of deviation value of an actual output voltage and an ideal output voltage of the conventional constant on-time controller changed by the application.

From the point of view of the system stability, the conventional constant on-time controller with non-fixed ripple have a better system stability due to the large ripple amplitude when the frequency is lower or the output voltage Vout is higher. On the other hand, the system stability becomes very poor due to the smaller ripple amplitude when the frequency is larger or the output voltage Vout is lower. Compared with this, the present invention provides the constant on-time controller with the fixed ripple to make the system maintain a better system stability regardless of the application environment.

Figure 1:
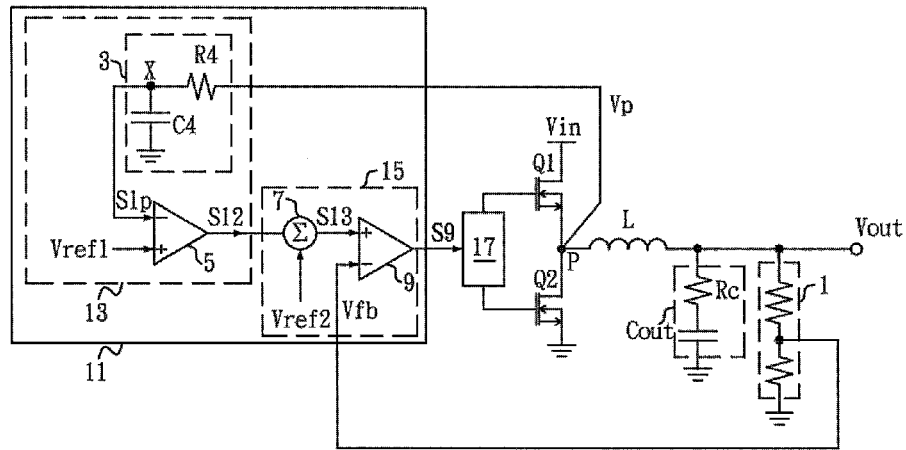
FIG. 1 is a circuit diagram of a conventional constant on-time controller with ripple compensation.

From the point of view of the transient response, when the frequency is smaller or the output voltage Vout is higher, the conventional constant on-time controller with non-fixed ripple cannot operate with the maximum duty cycle due to the large ripple amplitude. This causes a slow transient response when the loading is changing. In contrast, regardless of the application environment, the constant on-time controller with fixed ripple of the present invention can provide a better transient response when the loading is changing Besides, the conventional constant on-time controller with non-fixed ripple has the problem that comparison points of the voltage detection signal Vfb indicative of the output voltage Vout and the superimposed signal S13 (referring to FIG. 1) depends on application environment, which directly causes the output voltage Vout changing under different application environment and greatly reduces the precision in the output voltage Vout. Wherein, the comparison points mean that the levels of the voltage detection signal Vfb and the superimposed signal S13 when the comparator 9 generates the pulse width modulation signal S9. However, in the constant on-time controller with fixed ripple of the present invention, the comparison points of the voltage detection signal Vfb and the ripple modulated signal S4 are constant regardless of application environment, and so the output voltage Vout has a fixed deviation from the preset value, and the fixed deviation can be simply removed. Hence and the present invention can greatly raise the precision in the output voltage Vout.

Figure 5:
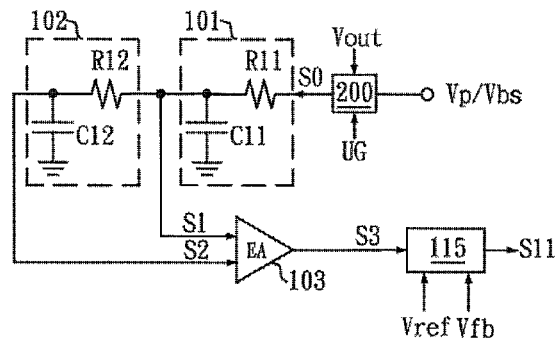
FIG. 5 is a schematic diagram of a partial circuit of a constant on-time controller according to a second preferred embodiment of the present invention.

FIG. 5 is a schematic diagram of a partial circuit of a constant on-time controller according to a second preferred embodiment of the present invention. Compared with the embodiment shown in FIG. 2, a level modulation circuit 200 is changed to receive the output voltage Vout and the control signal UG to determine the modulation amount of the amplitude of the ripple signal S3 for replacing the level modulation circuit 100 using the voltage Vp of the phase node P or the bootstrap voltage Vbs. Due to the control signal UG is configured to turn on and off the high-side transistor Q1, and thus the control signal UG can be filtered to be a signal indicative of the inductance L. The level modulation circuit 200 generates the quasi-square wave signal S0 according to the output voltage Vout and the control signal UG. The circuit operation of the low-pass filters 101 and 102, the amplifier 103 and the comparing circuit 115 are same as that in FIG. 2, and not repeated in here.

Figure 6:
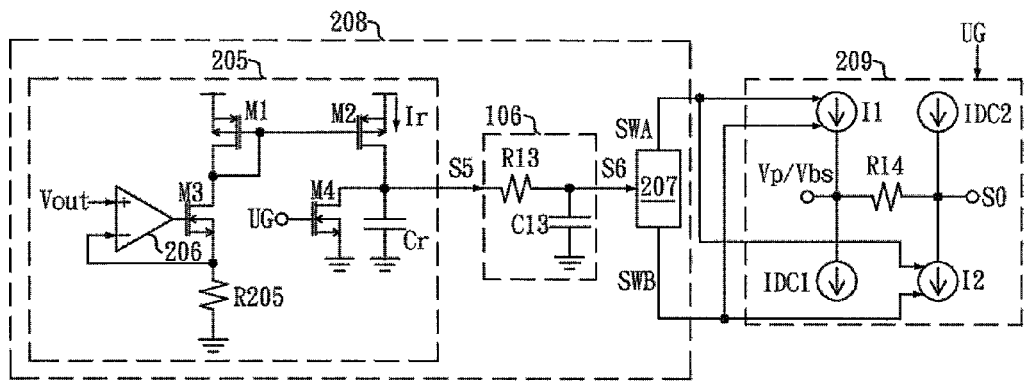
FIG. 6 is a schematic diagram of a level modulation circuit according to a second preferred embodiment of the present invention.

FIG. 6 is a schematic diagram of a level modulation circuit according to a second preferred embodiment of the present invention. The level modulation circuit comprises a sampling judgment circuit 208 and a voltage-drop generating circuit 209, and generates a quasi-square wave signal S0 according to the output voltage Vout (or the bootstrap voltage Vbs) and the control signal UG. The sampling judgment circuit 208 comprises a ripple amplitude sampling circuit 205, the filter 106 and a voltage judging circuit 207, and generates control signals SWA and SWB according to the output voltage Vout and the control signal UG. The ripple amplitude sampling circuit 205 comprises transistors M1~M4, an error amplifier 206, a resistance R205 and a capacitance Cr. The transistor M3, the error amplifier 206 and the resistance R205 are composed to be a voltage-to-current converter. The transistor M3 and the resistance R205 are connected in series, and the other end of the resistance R205 is connected to the grounding. A non-inverting input end of the error amplifier 206 receives the output voltage Vout, and an inverting input end thereof is connected to a connection node of the transistor M3 and the resistance R205. The error amplifier 206 modulates an equivalent conduction resistance of the transistor M3 to make a voltage cross the resistance R205 be equal to the output voltage Vout. Thus, the current flowing through the transistor M3 is proportional to the output voltage Vout, and a current mirror composed of the transistors M1 and M2 mirrors the current of the transistor M3 to generate a current Ir for charging the capacitance Cr. The transistor M4 is connected to the capacitance Cr in parallel. During the on-time period, the high-side transistor Q1 of the constant on-time controller is turned on and the control signal UG is a high level to make the transistor M4 turn on. At this moment, the capacitance Cr is discharged for making a level of the voltage signal S5 be zero. During the off time period, the high-side transistor Q1 of the constant on-time controller is cut off, the control signal UG is a low level to make the transistor M4 cut off. At this moment, the capacitance Cr is charged by the current Ir and generates the voltage signal S5 with a level increasing with time. A slope of the voltage signal S5 is proportional to the output voltage Vout. The filter 106 filters the voltage signal S5, and generates the direct current signal S6 after filtering. The voltage judging circuit 207 generates the control signals SWA and SWB according to the direct current signal S6, and accordingly modulates a voltage of a voltage-drop generating circuit 209.

The voltage-drop generating circuit 209 comprises a current circuit and a resistance R14, and the current circuit has constant current sources IDC1 and IDC2 and controlled current sources I1 and I2. The constant current sources IDC1 and IDC2 and the controlled current sources I1 and I2 are controlled by the control signal UG and so the constant current sources IDC1 and IDC2 and the controlled current sources I1 and I2 operate only during the on-time period. When the application environment of the constant on-time controller is the typical condition, the currents of the constant current sources IDC1 and IDC2 and the controlled current sources I1 and I2 are equal, and thus the resistance R14 has no voltage there cross and the signals at two ends of the resistance R14, i.e.: the quasi-square wave signal S0 and the voltage Vp of the phase node P or the bootstrap voltage, have the same level and vary in phase. If the application environment of the constant on-time controller is not the typical condition, the magnitude of the ripple signal S3 deviates from the preset value or the preset range. The voltage judging circuit 207 modulates a voltage of the voltage-drop generating circuit 209 through control signals SWA and SWB. Thereby, modulating the level of quasi-square wave signal S0 to modulate the magnitude of the ripple signal S3 to the preset value or within the preset range.

Figure 7:
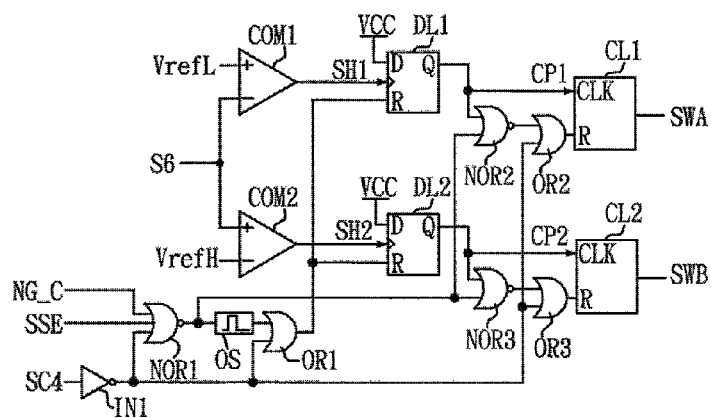
FIG. 7 is a schematic diagram of a voltage judging circuit according to a preferred embodiment of the present invention.

FIG. 7 is a schematic diagram of a voltage judging circuit according to a preferred embodiment of the present invention. The voltage judging circuit comprises comparators COM1 and COM2, D-type flip-flops DL1~DL2, an inverter IN1, NOR gates NOR1~NOR3, OR gates OR1~OR3, a pulse generator OS and counters CL1 and CL2. A non-inverting end of the comparator COM1 receives a minimum reference voltage VrefL and an inverting end thereof receives the direct current signal S6. The comparator COM1 generates a first compared signal SH1 when the direct current signal S6 is lower than the minimum reference voltage VrefL. An inverting end of the comparator COM2 receives a maximum reference voltage VrefH and a non-inverting end thereof receives the direct current signal S6. The comparator COM2 generates a second compared signal SH2 when the direct current signal S6 is higher than the maximum reference voltage VrefH. Wherein, when the maximum reference voltage VrefH and the minimum reference voltage VrefL are the maximum value and the minimum value of the direct current signal S6 which are allowed to deviate from the value in the typical application, and the maximum reference voltage VrefH is higher than the minimum reference voltage VrefL. Thereby, the ripple signal S3 are ensured to be modulated within a preset range, corresponding to the maximum reference voltage VrefH and the minimum reference voltage VrefL of the direct current signal S6. The NOR gate NOR1 receives a modulation starting signal SC4, a modulated ending signal SSE and an error signal NG_C. The error signal NG_C represents a cycle signal of the constant on-time controller. In the present embodiment, the control signal LG serves as the error signal NG_C. A default level of the modulation starting signal SC4 is a low level, and then is transferred to a high level after a preset time period when the soft-start of the constant on-time controller is started. A default value of the modulated ending signal SSE is a low level and then is transferred to a high level when the soft-start is ended. The main functions of the modulation starting signal SC4 and the modulated ending signal SSE are that confirm the system has entered into a stabilizing operation state. Of course, the present invention may determine the operation state by determining the output voltage Vout whether reaching a preset voltage value. For example, the modulation starting signal SC4 represents the output voltage Vout reaching to a first target value and the modulated ending signal SSE represents the output voltage Vout reaching to a second target value, wherein the first target value is smaller than a preset output voltage of the output voltage in a stable state, and the second target value is larger than the first target value but smaller than or equal to the preset output voltage. When the constant on-time controller operates normally, the NOR gate NOR1 outputs a high level signal during the period from the modulation starting signal SC4 being the high level to the modulated ending signal SSE being transferred to the high level, even the error signal NG_C is a low level, i.e., the low-side transistor Q2 is cut off. During the period, the voltage judging circuit executes voltage detecting and judging in response to the state of the low-side transistor Q2.

The D-type flip-flops DL1~DL2, the pulse generator OS and the OR gate OR1 serve as a detection and reset circuit. The detection and reset circuit is used for judging that any one of the first compared signal SH1 and the second compared signal SH2 is at the high level in each cycle of the modulation period. When the modulation starting signal SC4 is transferred to the high level, the inverter IN1 outputs a low level signal for activating the counters CL1~CL2. When the error signal NG_C is at the low level, the NOR gate NOR1 generates a high level signal to trigger the pulse generator OS generating a pulse width signal with a preset pulse width to OR gate OR1. At this moment, the output signals of the D-type flip-flops DL1~DL2 is at the low levels (i.e., reset to zero). In each cycle of the modulation period, if the control signal LG is the high level and the direct current signal S6 is lower than the minimum reference voltage VrefL, and the comparator COM1 generates the first compared signal SH1 and so the D-type flip-flop DL1 immediately output a first counting signal CP1. Similarly, in each cycle of the modulation period, if the control signal LG is the high level and the direct current signal S6 is higher than the maximum reference voltage VrefH, and the comparator COM2 generates the second compared signal SH2 and so the D-type flip-flop DL2 immediately output a second counting signal CP2. The counter CL1 is used for detecting whether the numbers of times of the first counting signal CP1 continuously being at the high level reaching a preset value. The counter CL2 is used for detecting whether the numbers of times of the second counting signal CP2 continuously being at the high level reaching the preset value. In any one cycle of the modulation period, if the direct current signal S6 is within the range of the maximum reference voltage VrefH and the minimum reference voltage VrefL, the first counting signal CP1 and the second counting signal CP2 are reset to zero. This circuit design can avoid the error judgment due to the noise interference. The counter CL1 determines reduces the current of the controlled current sources I1 and I2 when the counted result reaches the preset value. Thus, the resistance R14 has a bias current flowing from the right side to the left side and the quasi-square wave signal S0 is higher than the voltage Vp of the phase node P or the bootstrap voltage Vbs. Thereby, the amplitude of the ripple signal S3 raises up to make the direct current signal S6 return to be above the minimum reference voltage VrefL. Similarly, the counter CL2 increases the current of the controlled current sources I1 and I2 when the counted result reaches the preset value. Thus, the resistance R14 has a bias current flowing from the left side to the right side and the quasi-square wave signal S0 is lower than the voltage Vp of the phase node P or the bootstrap voltage Vbs. Thereby, the amplitude of the ripple signal S3 can reduce down to make the direct current signal S6 return under the maximum reference voltage VrefH.

Of course, except the two comparison level of the maximum reference voltage VrefH and the minimum reference voltage VrefL show as FIG. 7, the present invention may increase new comparison level(s) according to the actual requirement for reaching a more accurate adjustment ability.

Figure 8:
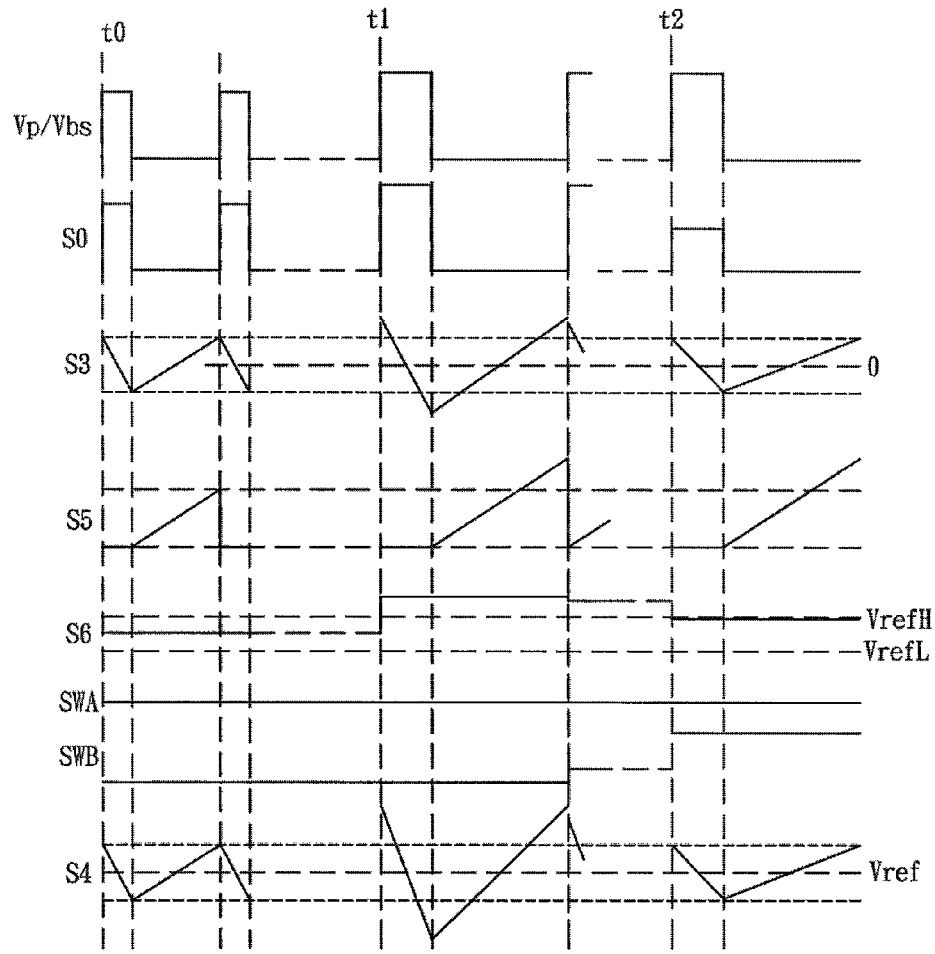
FIG. 8 shows signal waveforms of the embodiments shown in FIG. 6 and FIG. 7.

FIG. 8 shows signal waveforms of the embodiments shown in FIG. 6 and FIG. 7. During the time point t0 to t1, the application environment of the constant on-time controller is the typical condition. The amplitude of the ripple signal S3 is equal to the preset value, and so the voltage judging circuit 207 does not generate the control signals SWA and SWB. Therefore, the voltage-drop generating circuit 209 does not generate a voltage there cross, and the level of the quasi-square wave signal S0 are equal to and synchronous with the voltage Vp of the phase node P or the bootstrap voltage Vbs. At the time point t1, a frequency of the constant on-time controller in a new application environment is lower and not the typical condition. Under this condition, the voltage signal S5 and the direct current signal S6 become larger, and so the direct current signal S6 is higher than the maximum reference voltage VrefH. Therefore, the voltage judging circuit 207 generates the controls SWA and SWB to modulate the controlled current sources I1 and I2 to correct the ripple signal S3, the voltage signal S5, the direct current signal S6 and the ripple modulated signal S4 executing modulating toward the preset ranges. At the time point t2 after the modulation period, the direct current signal S6 is modulated within the range of the maximum reference voltage VrefH and the minimum reference voltage VrefL.

Figure 9:
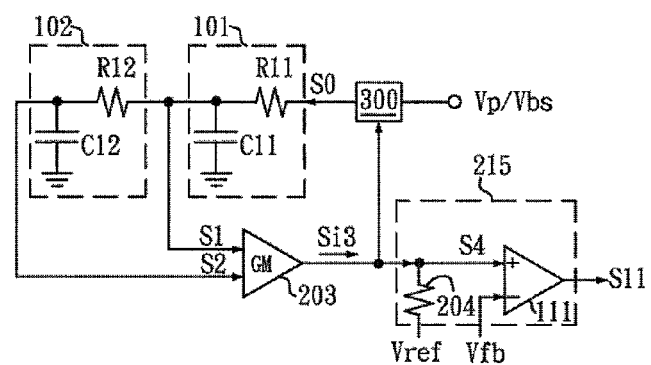
FIG. 9 is a schematic diagram of a partial circuit of a constant on-time controller according to a third preferred embodiment of the present invention.

FIG. 9 is a schematic diagram of a partial circuit of a constant on-time controller according to a third preferred embodiment of the present invention. Compared with the embodiment shown in FIG. 2, the voltage amplifier of the amplifier 103 is replaced by a transconductance amplifier 203. The transconductance amplifier 203 receives the first signal S1 and the second signal S2 and generates a current ripple signal Si3 according to the level difference between the first signal S1 and the second signal S2. A level modulation circuit 300 is coupled to an output end of the transconductance amplifier 203 for sampling an amplitude of the current ripple signal Si3, and modulates the level of the quasi-square wave signal S0 according to the sampled result to further modulate the levels of the first signal S1 and the second signal S2. For different amplitudes of the ripple signal S3 due to the different application environments, the constant on-time controller corrects the amplitude of the ripple signal S3 by this circuit design to reduce the amplitude difference in the different application environment, and even fix the amplitude regardless of the different application environments. A comparing circuit 215 comprises a signal injection circuit 204 and the comparator 111. In the present embodiment, the signal injection circuit 204 is a resistance, and the current ripple signal Si3 flows through the signal injection circuit 204 to generate a bias voltage there on. The ripple modulated signal S4 is generated by biasing the voltage signal Vref with the bias voltage to the non-inverting end of the comparator 111. The inverting end of the comparator 111 receives the voltage detection signal Vfb. The comparator 111 compares the voltage detection signal Vfb with the ripple modulated signal S4 and accordingly generates the comparison result signal S11. When the level of the ripple modulated signal S4 is higher than the voltage detection signal Vfb, the comparison result signal S11 is at the high level. When the level of the ripple modulated signal S4 is lower than the voltage detection signal Vfb, the comparison result signal S11 is at the low level. Of course, the signal injection circuit 204 may be used to inject the information of the current ripple signal Si3 into the voltage detection signal Vfb to form the ripple modulated signal S4. Correspondingly, the non-inverting end of the comparator 111 receives the voltage reference signal Vref, and the inverting end thereof receiving the ripple modulated signal S4, without affecting the aforementioned function.

Figure 10:
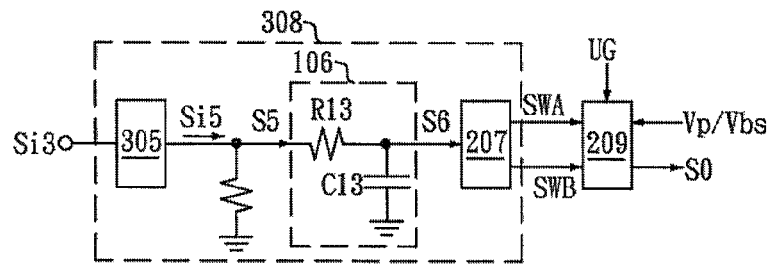
FIG. 10 is a schematic diagram of a level modulation circuit according to a third preferred embodiment of the present invention.

FIG. 10 is a schematic diagram of a level modulation circuit according to a third preferred embodiment of the present invention. The level modulation circuit comprises a sampling judgment circuit 308 and the voltage-drop generating circuit 209 and determines the modulation amounts for the first signal S1 and the second signal S2 according to the amplitude of the current ripple signal Si3. Then, the level modulation circuit biases the voltage Vp of the phase node P or the bootstrap voltage Vbs to modulate the level of the quasi-square wave signal S0 for further modulating the first signal S1 and the second signal S2.

The sampling judgment circuit 308 comprises a current absolute value circuit 305, filter 106 and the voltage judging circuit 207. Because the current ripple signal Si3 is a triangle wave current signal with zero DC component, the current ripple signal Si3 passes through the current absolute value circuit 305 to generate a current signal Si5 with a double frequency and a DC component larger than zero. A resistance is used to transfer the current signal Si5 into the voltage signal S5. The filter 106 comprises the resistance R13 and the capacitance C13, and filters the high frequency components of the voltage signal S5 to generate the direct current signal S6. Then, the voltage judging circuit 207 detects the direct current signal S6 for judging the direct current signal S6 whether being equal to the preset value or within the preset range, and accordingly generates the control signals SWA and SWB. The descriptions of the voltage judging circuit 207 and the voltage-drop generating circuit 209 can refer to the corresponding embodiment, and it is not repeated in here.

Figure 11:
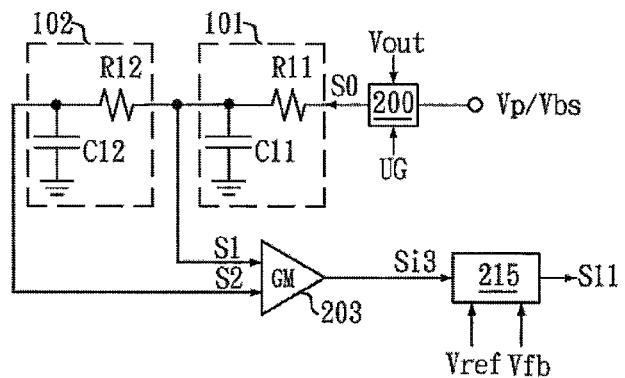
FIG. 11 is a schematic diagram of a partial circuit of a constant on-time controller according to a fourth preferred embodiment of the present invention.

FIG. 11 is a schematic diagram of a partial circuit of a constant on-time controller according to a fourth preferred embodiment of the present invention. Compared with the embodiment shown in FIG. 9, the level modulation circuit 300 is replaced by the level modulation circuit 200. The level modulation circuit 200 receives the output voltage Vout and the control signal UG, not the voltage Vp of the phase node P or the bootstrap voltage Vbs of the level modulation circuit 300, for determining the modulation amount of the amplitude of the ripple signal S3. The level modulation circuit 200 generates the quasi-square wave signal S0 according to the output voltage Vout and the control signal UG. The operations of the low-pass filters 101 and 102, the transconductance amplifier 203 and the comparing circuit 215 are the same with that in FIG. 9, and it is not repeated in here.

Figure 12:
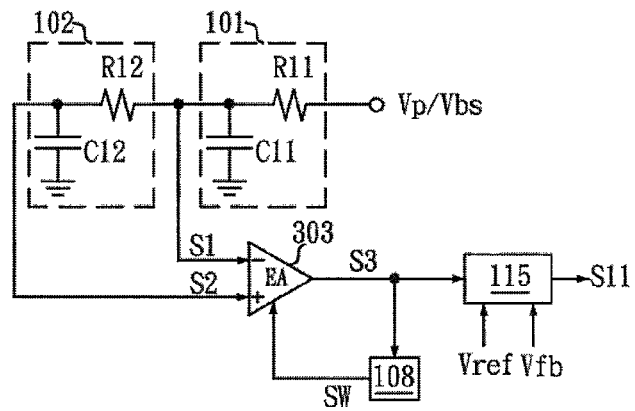
FIG. 12 is a schematic diagram of a partial circuit of a constant on-time controller according to a fifth preferred embodiment of the present invention.

FIG. 12 is a schematic diagram of a partial circuit of a constant on-time controller according to a fifth preferred embodiment of the present invention. Compared with the embodiment shown in FIG. 2, the amplifier 103 is replaced by a controllable amplifier 303, and the voltage-drop generating circuit 109 of the level modulation circuit is omitted in the present embodiment. The controllable amplifier 303 receives the control signal SW generated by the sampling judgment circuit 108, and raises or lowers a gain value thereof according to the control signal SW. The controllable amplifier 303 receives the first signal S1 and the second signal S2, and generates the ripple signal S3 according to the gain value and the level difference between the first signal S1 and the second signal S2 and so the amplitude of the ripple signal S3 is modulated by modulating the gain value.

Figure 13:
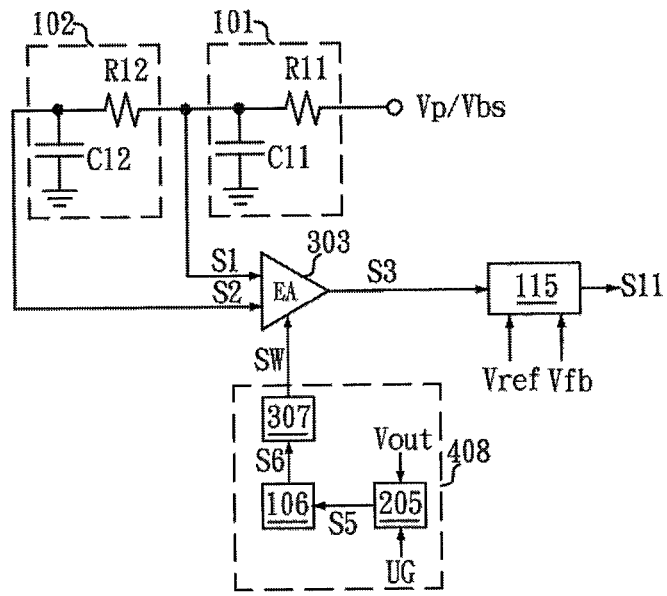
FIG. 13 is a schematic diagram of a partial circuit of a constant on-time controller according to a sixth preferred embodiment of the present invention.

FIG. 13 is a schematic diagram of a partial circuit of a constant on-time controller according to a sixth preferred embodiment of the present invention. Compared with the embodiment shown in FIG. 12, the sampling judgment circuit 108 is replaced by a sampling judgment circuit 408. The sampling judgment circuit 408 comprises the ripple amplitude sampling circuit 205, the filter 106 and the voltage judging circuit 307, and generates the control signal SW according to the output voltage Vout and the control signal UG. The voltage judging circuit 307 can be an inverse function circuit that its operation complies with K=Y*X, wherein K is a constant, X is the input signal, and Y is the output signal. Therefore, the level of the control signal SW is smaller when the level of the direct current signal S6 is higher, or the level of the control signal SW is higher when the level of the direct current signal S6 is smaller. The operation of other circuits can refer to the corresponding descriptions in the other embodiment, and it is not repeated in here.

Figure 14:
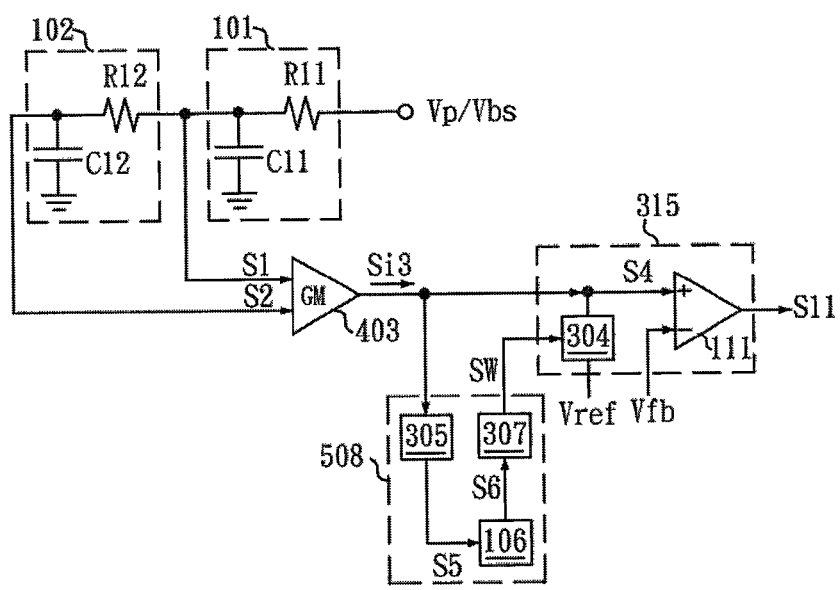
FIG. 14 is a schematic diagram of a partial circuit of a constant on-time controller according to a seventh preferred embodiment of the present invention.

FIG. 14 is a schematic diagram of a partial circuit of a constant on-time controller according to a seventh preferred embodiment of the present invention. Compared with the embodiment shown in FIG. 12, the controllable amplifier 303 is replaced by the transconductance amplifier 403 and the sampling judgment circuit 108 is replaced by a sampling judgment circuit 508. Besides, a comparing circuit 315 comprises a signal injection circuit 304 and the comparator 111. The sampling judgment circuit 508 comprises the current absolute value circuit 305, the filter 106 and the voltage detecting 307, the operations thereof can refer to the corresponding descriptions in the other embodiments, and it is not repeated in here. The sampling judgment circuit 508 generates the control signal SW according to the amplitude of the current ripple signal Si3. The signal injection circuit 304 comprises an adjustable resistance circuit, and raises or lowers an impedance value according to the control signal SW. The current ripple signal Si3 flows through the signal injection circuit 304 and generate a bias voltage according to the impedance value. The ripple modulated signal S4 is generated by biasing the voltage signal Vref with the bias voltage. The non-inverting end of the comparator 111 receives the ripple modulated signal S4 and the inverting end thereof receives the voltage detection signal Vfb. The comparator 111 compares the voltage detection signal Vfb with the ripple modulated signal S4 for generating the comparison result signal S11. Of course, the signal injection circuit 304 may be coupled to the voltage detection signal Vfb and inject the information of the current ripple signal Si3 into the voltage detection signal Vfb to form the ripple modulated signal S4. Correspondingly, the non-inverting end of the comparator 111 receives the voltage reference signal Vref, and the inverting end thereof receiving the ripple modulated signal S4, without affecting the functions of the present invention.

Figure 15:
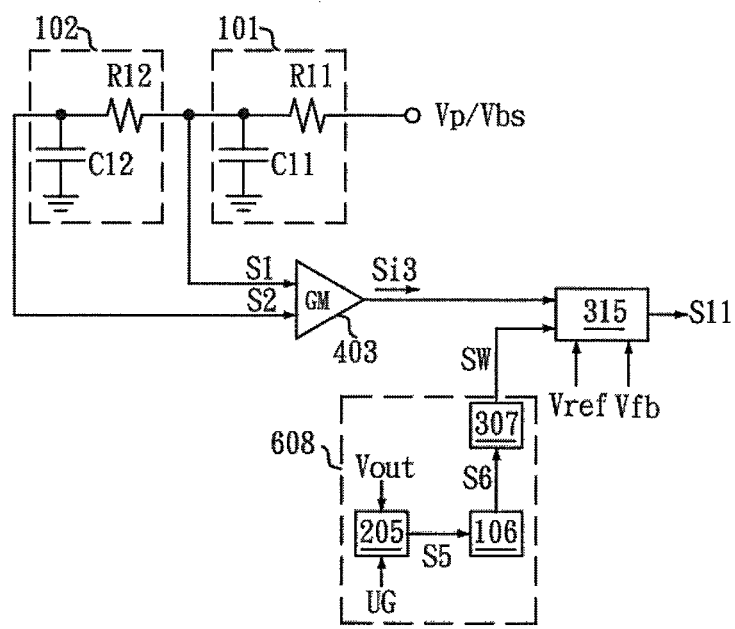
FIG. 15 is a schematic diagram of a partial circuit of a constant on-time controller according to an eighth preferred embodiment of the present invention.

FIG. 15 is a schematic diagram of a partial circuit of a constant on-time controller according to an eighth preferred embodiment of the present invention. Compared with the embodiment shown in FIG. 14, the sampling judgment circuit 508 is replaced by a sampling judgment circuit 608. The sampling judgment circuit 608 comprises the ripple amplitude sampling circuit 205, the filter 106 and the voltage judging circuit 307, and generates the control signal SW according to the output voltage Vout and the control signal UG. The comparing circuit 315 generates a bias voltage according to the control signal SW and the current ripple signal Si3 to modulate the level of the voltage reference signal Vref or the voltage detection signal Vfb according to the bias voltage, for avoiding the issues of the deviation value of the output voltage varying with the application environments.

To sum up the aforementioned, the present invention judges the ripple amplitude according to the amplitude of the ripple signal or the output voltage or the control signal, and accordingly modulates the ripple amplitude. Thus, the ripple amplitude of the constant on-time controller of the present invention all can be controlled within the preset value or the preset range in the different application environments, and reaches to avoid the issues of the deviation value changing with the application environments of the actual output voltage and the ideal output voltage value.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A constant on-time controller, adapted to control a converting circuit to switch for generating an output voltage, comprising:
   a ripple generator, generating a ripple signal according to a first signal having a component in response to a current flowing through an inductance of the converting circuit and a second signal having a component in response to the output voltage or the current of the inductance, wherein an amplitude of the second signal is smaller than an amplitude of the first signal when the second signal has the component in response to the current of the inductance, and the ripple generator comprises a level modulation circuit to and modulates the levels of the first signal and the second signal according to an amplitude of the ripple signal;
   a comparing circuit, receiving the ripple signal, a voltage reference signal and a voltage detection signal indicative of the output voltage, and modulating one of the voltage reference signal and the voltage detection signal according to the ripple signal for generating a ripple modulated signal with a ripple information of the ripple signal, and the comparing circuit comparing the ripple modulated signal with the other of the voltage reference signal and the voltage detection signal for generating a comparison result signal; and
   a logic control circuit, generating a control signal with fixed pulse width according to the comparison result signal for controlling the switching of the converting circuit.

2. The constant on-time controller according to claim 1, wherein the level modulation circuit modulates the levels of the first signal and the second signal after receiving a modulation starting signal, which represents: A. reaching a preset time period after starting the constant on-time controller; or B. the output voltage reaching a preset voltage after starting the constant on-time controller.

3. The constant on-time controller according to claim 2, wherein the ripple generator further comprises a voltage judging circuit to compare the ripple signal with a preset range or a preset value, and the level modulation circuit modulates the levels of the first signal and the second signal according to the comparison result.

4. The constant on-time controller according to claim 3, wherein the level modulation circuit comprises a resistance and a current circuit, and the current circuit modulates a current flowing through the resistance according to the comparison result of the voltage judging circuit.

5. The constant on-time controller according to claim 1, wherein the ripple generator further comprises a voltage judging circuit to compare the ripple signal with a preset range or a preset value, and the level modulation circuit modulates the levels of the first signal and the second signal according to the comparison result.

6. The constant on-time controller according to claim 5, wherein the level modulation circuit comprises a resistance and a current circuit, and the current circuit modulates a current flowing through the resistance according to the comparison result of the voltage judging circuit.

7. A constant on-time controller, adapted to control a converting circuit to switch for generating an output voltage, comprising:
   a ripple generator, generating a ripple signal according to a first signal having a component in response to a current flowing through an inductance of the converting circuit and a second signal having a component in response to the output voltage or the current of the inductance, wherein an amplitude of the second signal is smaller than an amplitude of the first signal when the second signal has the component in response to the current of the inductance, and the ripple generator comprises a level modulation circuit to modulate the amplitude of the ripple signal according to the output voltage and a control signal or according to an amplitude of the ripple signal;
   a comparing circuit, receiving the ripple signal, a voltage reference signal and a voltage detection signal indicative of the output voltage, and modulating one of the voltage reference signal and the voltage detection signal according to the ripple signal for generating a ripple modulated signal with a ripple information of the ripple signal, and the comparing circuit comparing the ripple modulated signal with the other of the voltage reference signal and the voltage detection signal for generating a comparison result signal; and
   a logic control circuit, generating the control signal with fixed pulse width according to the comparison result signal for controlling the switching of the converting circuit.

8. The constant on-time controller according to claim 7, wherein the ripple generator comprises an amplifier to generate the ripple signal according to a level difference of the first signal and the second signal, and the level modulation circuit modulates a gain value of the amplifier.

9. The constant on-time controller according to claim 7, wherein the ripple generator comprises an amplifier, and the level modulation circuit modulates levels of the first signal and the second signal, and the amplifier generates the ripple signal according to a level difference of the first signal and the second signal.

10. The constant on-time controller according to claim 7, wherein the level modulation circuit modulates levels of the first signal and the second signal after receiving the modulation starting signal, and the modulation starting signal represents: A. reaching a preset time period after starting the constant on-time controller; or B. the output voltage reaching a preset voltage after starting the constant on-time controller.

11. The constant on-time controller according to claim 10, wherein the ripple generator further comprises a voltage judging circuit to compare the ripple signal with a preset range or a preset value, and the level modulation circuit modulates levels of the first signal and the second signal according to the comparison result.

12. The constant on-time controller according to claim 11, wherein the level modulation circuit comprises a resistance and a current circuit, and the current circuit modulates a current flowing through the resistance according to the comparison result of the voltage judging circuit.

13. The constant on-time controller according to claim 7, wherein the ripple generator further comprises a voltage judging circuit to compare the ripple signal with a preset range or a preset value, and the level modulation circuit modulates levels of the first signal and the second signal according to the comparison result.

14. The constant on-time controller according to claim 13, wherein the level modulation circuit comprises a resistance and a current circuit, and the current circuit modulates a current flowing through the resistance according to the comparison result of the voltage judging circuit.

15. A constant on-time controller, adapted to control the switching of a converting circuit for generating an output voltage, comprising:

a ripple generator, generating a ripple signal according to a first signal having a component in response to a current flowing through an inductance of the converting circuit and a second signal having a component in response to the output voltage or the current of the inductance, wherein an amplitude of the second signal is smaller than an amplitude of the first signal when the second signal has the component in response to the current of the inductance, and the ripple generator comprises a level modulation circuit to generate a modulated signal according to the output voltage and a control signal or according to an amplitude of the ripple signal;

a comparing circuit, receiving the ripple signal, a voltage reference signal and a voltage detection signal indicative of the output voltage, and modulating one of the voltage reference signal and the voltage detection signal according to the ripple signal for generating a ripple modulated signal with a ripple information of the ripple signal, and the comparing circuit comparing the ripple modulated signal with the other of the voltage reference signal and the voltage detection signal for generating a comparison result signal, wherein the comparing circuit comprises a signal injection circuit to modulate an amplitude of the ripple modulated signal according to the modulated signal; and a logic control circuit, generating the control signal with fixed pulse width according to the comparison result signal for controlling the switching of the converting circuit.

16. The constant on-time controller according to claim 15, wherein the ripple generator comprises a transconductance amplifier to generate the ripple signal according to the first signal and the second signal, and the signal injection circuit comprises an adjustable resistance circuit coupled to the ripple signal and one of the voltage reference signal and the voltage detection signal for generating the ripple modulated signal, and an impedance value of the adjustable resistance circuit is modulated according to the modulated signal.

17. The constant on-time controller according to claim 15, wherein the level modulation circuit generates the modulated signal after receiving the modulation starting signal, which represents: A. reaching a preset time period after starting the constant on-time controller; or B. the output voltage reaching a preset voltage after starting the constant on-time controller.

* * * * *